July 28, 1936.  L. HÄRTER  2,049,374
ELASTIC WHEEL FOR VEHICLES
Filed March 22, 1935  2 Sheets-Sheet 1
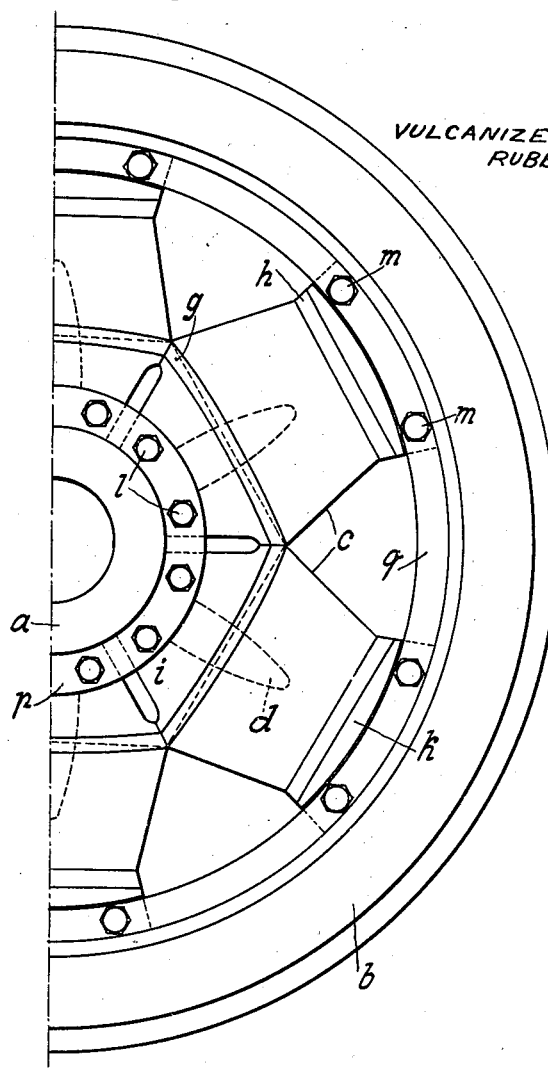
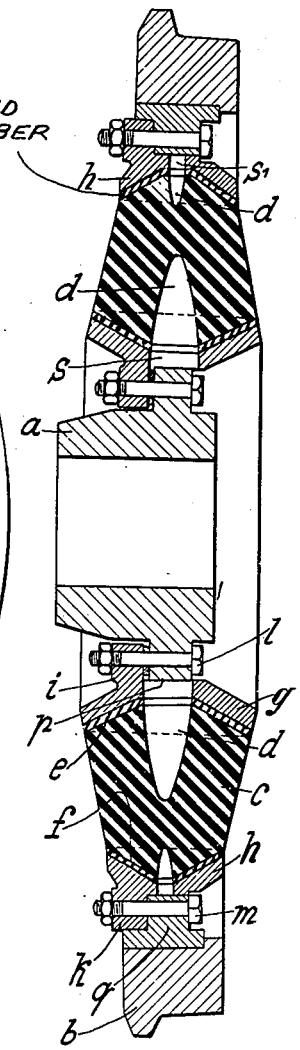

July 28, 1936.  L. HÄRTER  2,049,374
ELASTIC WHEEL FOR VEHICLES
Filed March 22, 1935  2 Sheets-Sheet 2
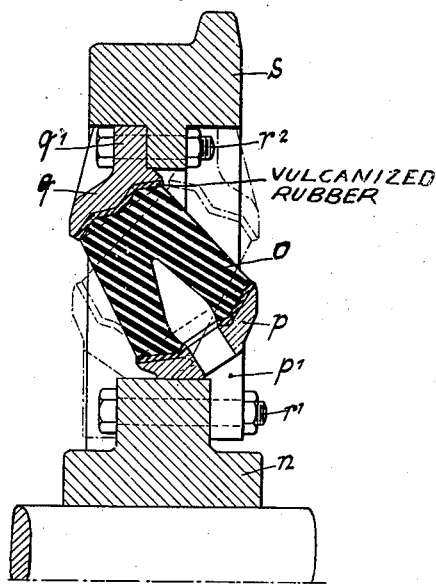
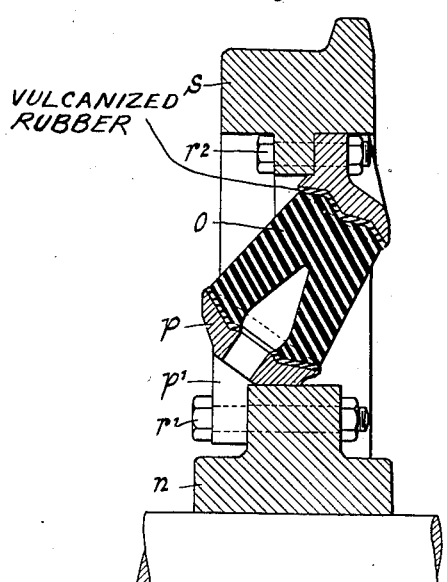
Inventor
Ludwig Härter
By Watson E. Coleman
Attorney Patented July 28, 1936

2,049,374

UNITED STATES PATENT OFFICE 2,049,374

ELASTIC WHEEL FOR VEHICLES

Ludwig Härter, Dresden, Germany

Application March 22, 1935, Serial No. 12,500
In Germany February 22, 1934

12 Claims. (Cl. 295—11)

This invention relates to an elastic wheel for vehicles, more particularly for rail vehicles, having soft rubber elements tensioned between the rim and the hub portion of the wheel.

The invention consists in the fact that the soft rubber members connect the rim with the hub in the form of radial spokes, and possess at their ends rigid holding members vulcanized on to the same, which holding members are detachably secured to the rim and the hub and bear against the inner or outer faces thereof respectively. By reason of this arrangement the rim is imparted an extensive resiliency in all directions in relation to the hub, whilst the soft rubber members are subjected only to those strains which they are capable of withstanding. The rim is able to recede radially in relation to the hub within wide limits, the soft rubber members being capable of deformation without obstruction. The rim of the wheel is moreover capable of considerable movement in relation to the hub, both laterally as well as in the peripheral direction. These two possibilities of movement on the part of the rim offer considerable advantage, particularly when the vehicle is travelling in a curve, insofar as by reason of the resiliency of the rim in the peripheral direction a differential effect is rendered possible between the two wheels mounted on the same axle, and moreover, owing to the lateral resiliency of the rim, the planes of the wheel flanges are able to adjust themselves to the curvature of the rails. As a result of this the wear of the wheel flanges and the rails, particularly when travelling in curves or over points, is considerably reduced. There is also obtained by reason of the elastic interception of the lateral shocks a steady joltless run of the vehicle. The provision of rigid holding members vulcanized on to the ends of the spoke-like soft rubber members is of particular importance insofar as in this manner it is a simple matter to exchange the spokes. Further, there is prevented wear of the soft rubber members, which, particularly when employing a soft rubber ring wedged between rim and wheel disc, experience has shown always to occur first at the supporting faces.

It has been found that for increasing the life of the soft rubber members the form of the rigid holding members vulcanized on to the same constitutes a decisive factor. According to the invention, these rigid holding members are constructed in cup-like form having inner faces which ascend obliquely or in curved fashion towards the edges of the cups as compared with the particular periphery of the rim or the hub. This form of the cup-like members has the effect that by reason of the different possible movements on the part of the rim in relation to the hub the spoke-like soft rubber members are subjected primarily to pressure and at the most only to little extent to bending strain, and that detachment of the supported ends of the soft rubber members is prevented by the cup-like holding members. In this connection advantage is obtained in furnishing each of the soft rubber members with a hollow space open towards the hub, and providing in the inner holding member an aperture made to register with this space. In view of the particular form of the supporting faces for the soft rubber members the provision of this hollow space results in the fact that owing to the pressure which primarily is exerted on the soft rubber members the rubber is displaced practically without exception into the hollow spaces, there being obtained in this fashion particularly favorable conditions of tension at the supported ends of the soft rubber members. At the same time, owing to the variation in the volume of the hollow spaces occurring upon the varying pressure loads, there occurs an alternate suction and expulsion of air, the soft rubber members thus being effectively cooled.

In order to be able to connect the cup-like holding members vulcanized on to the soft rubber members in ready and reliable fashion to the parts of the wheel the cup-like members are furnished with flanges, which extend parallel to the middle plane of the wheel and are connected by means of screws or the like with inwardly or outwardly directed flanges on the rim and the hub. The wheel pressure and the jolts occurring in a radial direction are in the case of this arrangement transmitted by the hub or rim in immediate fashion, i. e., without load on the connecting screws, to the cup-like holding members, and accordingly to the soft rubber spokes.

In order to especially adapt my new rubber spoke wheel to lateral thrust, I prefer to place the spokes in a tilted position between rim and hub, the tilt of adjacent spokes being in opposite directions, preferably symmetrical to the centre plane of the wheel. In this way an increased resistance is obtained toward axially directed stresses, such stresses, for instance, occurring when the car is negotiating curves. The tilted position of the spoke is obtained by a corresponding position of the attachment flanges which are alternately placed against alternate sides of the attachment flanges of wheel rim and wheel hub, respectively.

A possible form of embodiment of the invention is illustrated by way of example in the accompanying drawings, in which Fig. 1 is a plan view, and Fig. 2 an axial section of the elastic vehicle wheel according to the invention.

Figs. 3 and 4 show axial sections taken in different radial planes of the wheel and showing tilted positions of adjacent spokes, the relative position of the spoke shown in Fig. 4 being indicated in Fig. 3 in dash-and-dotted lines.

The wheel comprises in substance the hub $a$, the rim $b$, and a number of, for example six, intermediately disposed soft rubber members $c$ in the form of radial spokes. The soft rubber members have an approximately elliptical cross-section, and each contain a hollow space $d$, which is open towards the hub. At the inner and outer ends the spokelike soft rubber members are connected at $e$ and $f$ by vulcanization with cup-like holding members $g$ and $h$. The inner faces of the cup-like holding members ascend towards the side obliquely and in the peripheral direction in curved fashion towards the edges of the cups, the ends of the soft rubber members thus being supported on all sides. The angle of ascent of the inner faces of the cups in relation to the adjacent periphery of the hub or the rim is preferably equal at all points, the inner faces accordingly receiving in the peripheral direction a curvature which approximately corresponds with a logarithmic spiral.

The cup-like holding members $g$ and $h$ are furnished with flanges $i$ and $k$ extending parallel to the middle plane of the wheel, which flanges are connected by means of screws $l$ and $m$ (or by rivets or in similar fashion), with radially outwardly or inwardly directed flanges $p$ and $q$ on the hub $a$ and the rim $b$. In the form of embodiment shown in the drawings the flange $p$ is integral with the hub $a$, whilst the flange $q$ is produced separately and set into the rim $b$. The latter is preferably shrunk on to the flange $q$. This arrangement has the advantage that existing rims of normal construction may be employed. Naturally the flange $q$ may also be integral with the rim $b$, as is shown in Figs. 3 and 4.

The inner cup-like holding members $g$ for the soft rubber members $c$ each possess an aperture $s$, which registers with the mouth of the hollow space $d$ in the appertaining soft rubber member $c$. In this way the hollow spaces $d$ communicate with the outer atmosphere.

By reason of the spoke-like soft rubber members $c$ the rim $b$ is furnished with the possibility of yielding in all directions in relation to the hub $a$. Owing to the particular form of the cup-like holding members it is accomplished that upon the compression of the soft rubber members the rubber is displaced practically without exception into the hollow spaces $d$, the volume of these spaces thus being alternately increased and decreased. In consequence air is continuously sucked up and expelled by the hollow spaces, resulting in an effective cooling of the soft rubber members.

In Figs. 3 and 4 I have shown the spoke members made of soft rubber in a tilted position between rim $s$ and hub $n$. This tilted position is obtained by a corresponding position of the attachment flange $q^1$ of the cup-like holding member $q$ and the attachment flange $p^1$ of the cup-like holding member $p$. In this embodiment of my invention I have shown a cup-like member $q$, having two internal cavities which are united to ends of the rubber spoke $o$ in well-known manner by a vulcanizing operation. Adjacent spokes are tilted in opposite directions as is indicated in Fig. 3 by a dash-and-dotted line showing of the next spoke following the spoke $o$ shown in section. The spoke indicated in dash-and-dotted lines in Fig. 3 is shown in a radial section in Fig. 4. On comparison of the showing of Figs. 3 and 4 it will be seen that the spokes can be secured on alternate flange faces of the hub $n$ and rim $s$, respectively, to obtain an alternate leaning of the spoke.

It is to be particularly noted that the rubber elements $c$ are approximately elliptical in cross section with the longer axis of the ellipse extending circumferentially of the wheel. This particular form of spoke having its greatest diameter extending in the plane of rotation of the wheel is of great importance. It is a well known fact that rubber yields to a larger extent under tensional stress than it can be compressed by the same amount of pressure. The stress to which the spokes are subjected when the wheel revolves, is primarily a tensional stress; the rubber is stretched and consequently yields more under the revolving action than it is compressed under the car load. For this reason, and in order to balance the forces acting upon the rubber spokes, more material has to be placed crosswise of the rotational axis of the wheel than parallel thereto or, in other words, the spoke must have a major diameter greater than the length and greater in the plane of revolution of the wheel than transversely thereto. The tensional stresses developed while the wheel is revolving find a greater resistance within the larger mass of rubber material, and the movement of the rubber particles with relation to each other is decreased and maintained within safe limits.

Attention is called to the fact that the particular form of the supporting faces for the soft rubber members provides spaces for the reception of the rubber displaced under pressure. In fact, when the rubber spoke is subjected to pressure to the largest extent possible, there is no appreciable change in the exterior form of the spoke, while, with a flat supporting face, the same load would cause disformation of the exterior of the spoke and the setting up of splits and cracks within the skin of the spoke, which thereafter would speedily be worn away.

It will be understood that no limitation is made to the particular form of embodiment shown in the drawings, which has been quoted merely by way of example, and that numerous modifications are quite possible within the meaning of the above description and the annexed claims without departing from the spirit of the invention.

What I claim as new and desire to secure by Letters Patent is:—

1. An elastic wheel for vehicles, more particularly for rail vehicles, comprising, in combination, a hub, a rim, a plurality of spokes connecting said rim with said hub and consisting of soft rubber, a cup-like holding member at each end of each spoke, each end of each of said spokes being attached to the interior of the adjacent cup-like member, means for detachably securing the hub and rim to the cup-like members adjacent thereto, each of said soft rubber spokes being provided with at least one hollow space which is open towards the interior face of the adjoining cup-like holding member, and each of said holding members having an opening in line with a hollow space to establish communication of said hollow space with the exterior atmosphere.

2. An elastic wheel for vehicles, more particularly for rail vehicles, comprising, in combination, a hub, a rim, a plurality of spokes connecting said rim with said hub and consisting of soft rubber, at least one hollow space in each of said spokes, said hollow space extending longitudinally of the spoke and opening to the exterior atmosphere.

3. An elastic wheel for vehicles, more particularly for rail vehicles, comprising, in combination, a hub, a rim, and a plurality of compression resisting spokes connecting said rim with said hub and consisting of soft rubber yieldingly resisting compression, each of said spokes being positioned at an angle with the rotational middle plane of the wheel, and alternate spokes having opposite leanings towards the centre plane of the wheel.

4. An elastic wheel for vehicles, more particularly for rail vehicles, comprising, in combination, a hub, a rim, a plurality of spokes connecting said rim with said hub and consisting of soft rubber, a cup-like holding member at each end of each spoke, each of said soft rubber spokes being provided with at least one hollow space open towards the interior face of the adjoining cup-like holding member, each of said holding members having an opening in line with said hollow space and adapted to establish communication of the interior space with the exterior atmosphere, each of said spokes being positioned at an angle with the centre plane of the wheel, and alternate spokes having opposite leanings towards the centre plane of the wheel.

5. An elastic wheel for vehicles, more particularly for rail vehicles, comprising, in combination, a hub, a rim, a plurality of compression resisting spokes connecting said rim with said hub and consisting of soft rubber, a cup-like holding member at each end of each spoke, each end of each of said spokes being attached to the interior of the respective cup-like member, means for detachably securing the hub and rim to the cup-like members adjacent thereto, each of said spokes being provided with two cavities extending longitudinally thereof and each opening through an end of the spoke, and each cup-like member having an opening therethrough communicating with a cavity.

6. A wheel structure, comprising a hub and a rim, said hub having a circumferential flange lying in the plane of the rim and said rim having a centrally extending circumferential flange, a plurality of cup-like bodies each having an integral ear on the inner surface rigidly secured to the flange of said hub, a plurality of cup-like bodies each having an ear upon its outer surface rigidly secured to the flange of said rim, the transversely concave surfaces of each pair of said cup-like bodies being in confronting relation, and a plurality of compression resisting rubber spokes each being disposed between and having its ends engaged in and abutting against the confronting surfaces of a pair of cup-like bodies.

7. A wheel structure, comprising a hub and a rim, said hub having a circumferential flange lying in the plane of the rim and said rim having an inwardly extending circumferential flange on its inner surface, a plurality of transversely cup-like bodies each having an integral ear on its outer surface rigidly secured to the flange of said hub, a plurality of transversely cup-like bodies each having an ear upon its outer surface rigidly secured to the flange of said rim, the inner surfaces of said cup-like bodies being in confronting relation, and a plurality of compression resisting rubber spokes each being disposed between and having its ends engaged in and abutting against the opposed surfaces of a pair of cup-like bodies, the said pairs of cup-like bodies between which the spokes are disposed being arranged to dispose the longitudinal centers of the spokes at an angle with the medial plane of the wheel, the spokes being arranged in such position in staggered relation.

8. An elastic wheel for vehicles, more particularly for rail vehicles, comprising, in combination, a hub, a rim, and a plurality of compression resisting spokes connecting said rim with said hub and consisting of soft rubber, each of said spokes being positioned at an angle to the medial plane of the wheel, and alternate spokes having opposite leanings towards the center plane of the wheel, said angularly disposed spokes forming the sole connecting means between the hub and the rim.

9. A wheel of the character described, comprising a rim, a hub, a plurality of substantially dishlike members disposed about the hub and attached thereto, a plurality of substantially dishlike members disposed about the inner side of said rim, each of the said members upon the rim having the concave surface thereof directed inwardly toward the concave surface of a member on the hub, a plurality of rubber spokes each disposed between the opposed faces of two of said members and having its ends formed to fit in said faces, and means facilitating the transverse thickening of each spoke under longitudinal compression comprising a chamber formed from one end inwardly and longitudinally of the spoke.

10. A wheel of the character described, comprising a rim, a hub, a plurality of substantially trough-like members disposed around the hub and attached thereto, a plurality of substantially trough-like members disposed against the inner side of said rim, each of the said members upon the rim having the concave surface thereof directed inwardly toward the concave surface of a member on the hub, and a plurality of compression resisting rubber spokes each disposed between the opposed faces of two of said members and having its ends formed to fit in and abut against said faces, said spokes being disposed at an angle with the medial plane of the wheel and alternate ones being directed to the opposite side of the wheel from the others.

11. A resilient wheel, including a hub and a rim, the hub and rim each having circumferential lugs on their inner faces, trough-shaped confronting spoke supporting members associated respectively with the rim and hub, each of said members having a lug bolted to the corresponding lug on the rim or hub, the trough-shaped portion of each member being inclined to the plane of rotation of the wheel, each pair of outer and inner trough-shaped members being inclined reversely to the next adjacent pair, and compression resisting spokes of soft rubber disposed between each pair of outer and inner trough-shaped members abutting thereagainst and being vulcanized thereto, each spoke having a longitudinally extending cavity opening upon the inner end of the spoke and each of the inner trough-shaped portions having an opening therethrough communicating with the interior of the cavity.

12. A resilient wheel, including a hub, a rim and compression resisting spokes of soft rubber disposed between the hub and rim, all of said spokes being inclined transversely to the medial plane of the hub and rim, alternate spokes being inclined in relatively opposite directions, the spokes being operatively connected rigidly to the hub and rim.

LUDWIG HÄRTER.